3,021,906
DISK HARROW WITH EXTENSION GANGS
Charles H. Youngberg, Moline, Ill., assignor to Deere & Company, Moline, Ill., a corporation of Delaware
Original application Dec. 5, 1958, Ser. No. 778,412. Divided and this application Jan. 14, 1960, Ser. No. 2,394
5 Claims. (Cl. 172—397)

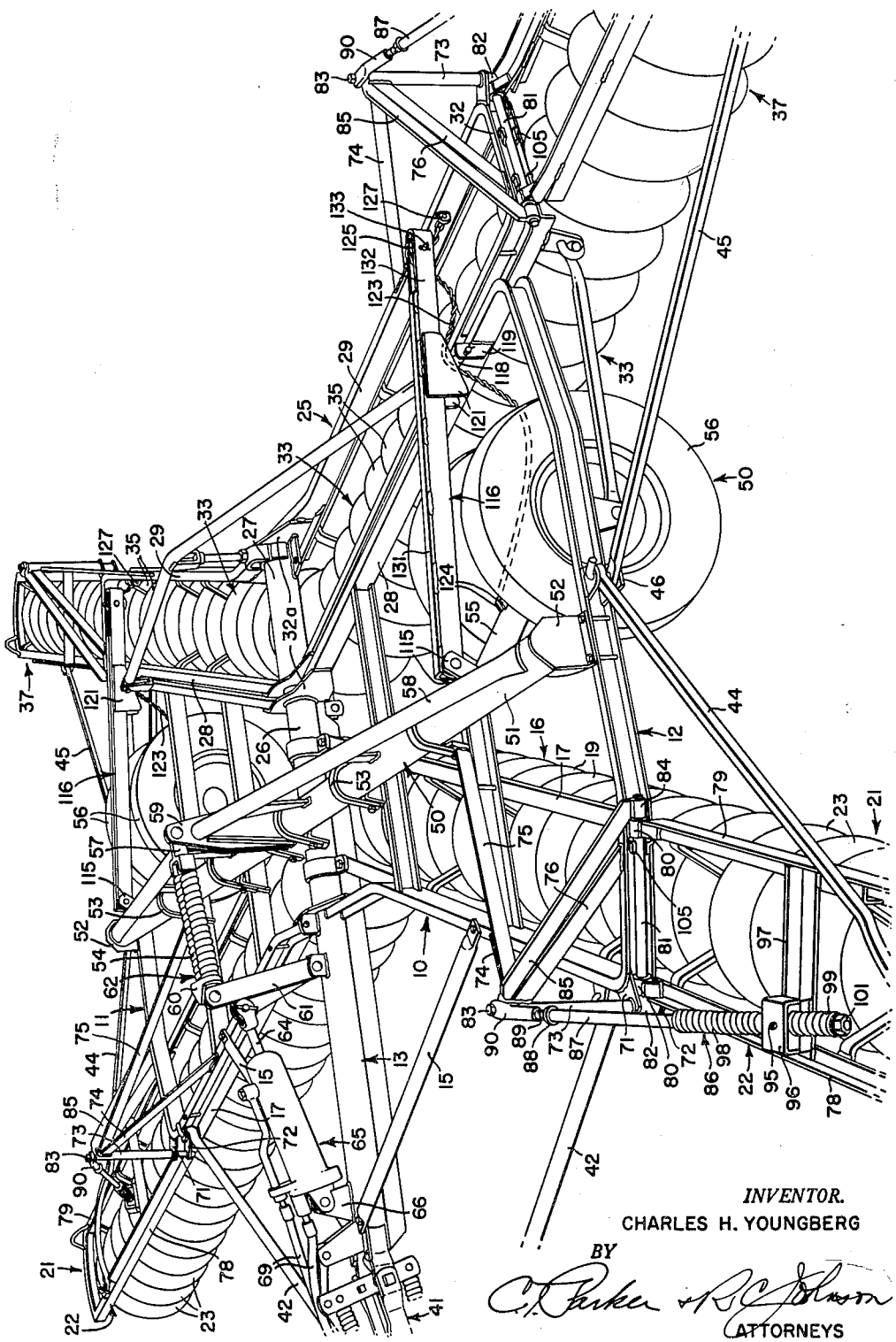

This application is a division of my copending application, Ser. No. 778,412, filed December 5, 1958, for Disk Harrow With Extension Gangs.

The present invention relates generally to agricultural implements and more particularly to tillage implements such as disk harrows and the like.

The object and general nature of this invention is a provision of a large capacity tandem wheel type disk harrow in which new and improved means is provided for reducing the overall width of the implement to facilitate transporting it through gates, along narrow roads, lanes or the like. A further feature of this invention is a provision of new and improved means for raising the rear gangs to transport position and holding them in transport so as to prevent undesirable oscillation of the rear units relative to the main frame of the disk harrow.

Another feature of this invention is a provision of spring cushioned connections between the power lift means and the disk gangs and associated frame, whereby impact loads, which may occur when transporting over rough ground or the like, are cushioned and are not imposed directly onto the power lift system.

These and other objects and advantages of this invention will be apparent to those skilled in the art after a consideration of the following detailed description taken in conjunction with the accompanying drawings, in which the single figure is a fragmentary perspective view showing the major portion of a large capacity tandem disk harrow in which the principles of the present invention have been incorporated.

The disk harrow in which the principles of the present invention have been incorporated comprises a main frame 10 that is made up of integrally connected right and left hand sections 11 and 12 and a generally centrally disposed fore-and-aft extending pipe member 13 to the forward end of which diagonal braces 15, which reenforce the forward portions of the frame sections 11 and 12, are connected.

A pair of inner front gangs 16, each including an inner gang frame means 17, are connected rigidly with the main frame 10, the inner front gang frames 17 forming integral portions of the main frame 10. A gang of disks 19 are carried by each of the inner front gang frames by the usual bearing means. A pair of outer or extension front gangs 21 are connected with the outer forward portion of the main frame 10 so as to swing both horizontally and vertically relative thereto. Each of the outer front gangs 21 includes an outer front gang frame 22 and a gang of disks 23 carried by the associated frame 22 by conventional bearing means.

A rear frame 25 is swingably connected on an extension 26 of the main frame 10, and the extension 26 is preferably in the form of a pipe on which a sleeve 27, forming a part of the frame 25, is rockably mounted. The frame 25 includes front and rear bars 28 and 29 suitably interconnected at their outer ends by end sections 32. An inner pair of rear gangs 33 are fixed to the rear frame 25, the right and left hand portions of the rear frame 25 serving as gang frames receiving the rear disks 35. A pair of outer rear gangs 37 are connected with the outer ends of the rear frame 25 for both vertical and horizontal swinging relative thereto. The front and rear outer or extension gangs are normally disposed in axial alinement with the inner front and rear gangs whereby, when extended, the disk harrow works a wide strip of ground. The harrow is connected with a suitable propelling tractor through a vertically swingable draft tongue 41, and braces 42 are connected between the generally forward portion of the tongue 41 and the main frame 10 at points on the latter adjacent the outer forward corner portions thereof. When in their extended positions, the outer extension gangs 21 and 37 are maintained in the proper position alined with the associated inner gangs by front and rear links 44 and 45, these links being connected at their outer ends with their associated extension gangs and at their inner ends to points of connection with the main frame 10, as indicated at 46.

The implement is raised out of operation and lowered into operation by ground wheel means 50 that includes a cross shaft 51 rockably mounted on the main frame 10 in suitable bearing brackets 52 and associated bearing straps 53. The rockshaft 51 has a pair of downwardly and rearwardly extending arms 55, the lower ends of which carry shafts (not shown) on which pairs of ground wheels 56 are journaled. The rockshaft 51 is reinforced by transverse bracing 58 comprising bars extending from the outer ends of the shaft 51 to a center arm 59 that forms a rigid part of the shaft 51. An actuating arm 61 is pivotally mounted on the main frame pipe 13 forward of the arm 59 and is connected with the latter through a cushioning unit 62 in the form of a pair of compression springs 54 slidable on rods (not shown) the rear ends of which are fixed to a connector 57 that is pivotally connected with the arm 59. The member 57 has seats to receive the springs, and slidably mounted on the forward ends of the rods and bearing against the front ends of the springs is a part 60 to which the actuating arm 61 is pivoted. Suitable stops (not shown) on the rods limit the extension of the springs. The actuating arm 61 receives the piston rod 64 of a hydraulic ram unit 65, the forward portion of which is pivotally connected with a lug 66 carried by the pipe 13. Hydraulic lines 69 lead to opposite ends of the cylinder of the unit 65. When the latter is extended, the ground wheel unit is rocked to force the ground wheels downwardly, thus raising the frame and associated disk gangs out of contact with the ground so that the implement is thus arranged for transport behind the associated tractor, being supported only by the hitch connection with the latter and by the ground wheels 56. The springs 54 act in compression to carry the weight of the implement when the wheels are lowered.

Where the headland or other turning space is adequate, the implement may be turned around, and/or otherwise maneuvered, while leaving the outer gangs in their extended position. However, where space is more limited, it may be desirable, especially where the implement is to be transported along highways and/or for considerable distances, to fold the extension gangs into positions alongside the inner gangs to more nearly center the load on the carrying wheels and eliminate the fairly large overhang that exists when the implement is transported on the ground wheels with the extension gangs in their extended or outwardly extending working position. To provide for easy and convenient shifting of the outer gangs into their folded or inner positions, new and improved frame-connecting hinge means is provided, and such means will now be described.

Generally speaking, the hinge means connecting the front and rear extension gangs with the associated inner frame structures are substantially identical and hence a description of one of such hinge units will suffice for a ready understanding of the instant invention. The hinge means connecting one of the front extension gangs to the associated portion of the main frame is shown in detail in the parent application identified above, from which it will be seen that the forward portion of the right hand end section 11 on the main frame 10 is provided with a pair of lugs 71 and 72 welded to the frame 10 substantially at the corner thereof.

The lugs 71 and 72 are apertured and a vertical sleeve 73 is welded at its lower end to the lug 71 and extends upwardly therefrom. Three braces 74, 75 and 76 (see the left hand unit, lower portion of the drawing) are arranged in upwardly extending relation and are welded to the upper portion of the sleeve 73. The lower or outer ends of the braces 74, 75 and 76 are welded to adjacent portions of the frame structure 10 so as to insure rigidity both in a longitudinal direction and a lateral direction for the pivot sleeve 73. The associated extension gang 21 includes front and rear angle members 78 and 79 provided at their inner ends with short sleeves 80 that are disposed in fore-and-aft spaced apart relation and receive a pivot bar 81, preferably in the form of a round rod or shaft. The forward end of the shaft 81 is connected as by welding to a block or pivot member 82 that is disposed between the lugs 71 and 72 and is apertured to receive a long bolt 83 that extends upwardly through the block 82, the lugs 71 and 72, and the sleeve 73, thereby forming vertical pivot means about which the associated extension gang may swing in a generally horizontal direction relative to the main frame from a position aligned with the associated inner gang to a position alongside the same. The outer or rear end of the pivot shaft 81 receives a short sleeve 84 to which is welded the rear or lower end of a brace bar 85 that extends upwardly and has its ends apertured to receive the upper portion of the pivot member 83. The pivot construction for the left hand extension gang 21 is substantially identical with that just described, and each extension gang 21 is thus connected for vertical swinging about the associated pivot 81 as a center, as just described, but vertical swinging of the extension gangs are limited by spring cushioned means 86 that will now be described.

Each of the spring cushioned units, one for each of the front and rear extension gangs, comprises a downwardly angled pipe 87 that at its upper end fixedly receives a nut member 88 into which the threaded section 89 of an upper connecting part 90 is adjustably received. The part 90 has a flattened end portion that is apertured to receive the upper end of the pivot bolt member 83. The lower or outer end of the pipe member 87 extends through a swivel member 95 that is connected by a U-shaped brace or bracket 96 with a cross bar 97 that forms a part of the associated extension gang frame 22. The pipe member 87 extends through the swivel member 95 and on each side of the latter the pipe member carries a compression spring, as indicated at 98 and 99. The outermost end of the member 87 receives a lock nut 101. By suitably adjusting the nut 101, enough compression may be put in the spring 98 so as to hold the extension gang in the proper position. When the harrow is raised into transport position, the weight of the extension gangs is transmitted through the spring 99 to the upper portion of the pivots 83, the spring 99 serving to cushion any impact loads that in transport, as when traveling over uneven ground, might be imposed on the hinge structure. The brace 85 swings with the extension gang when the latter is swung from an extended or working position around into its folded or transport position. In the working or extended position the pivot rod or shaft 81 is received in a U-shaped lug 105. By this means the frame of the extension gang is held in proper relation with respect to the associated main frame 10, yet the outer end of the extension gang may swing up and down, within limits, relative to the main frame about the axis defined by the pivot rod 81, such vertical swinging being limited by the springs 98 and 99.

The hinge construction connecting the inner portion of each of the front and rear extension gangs is substantially identical with that just described, and therefore further description is believed to be unnecessary, the same reference numerals being applied to the corresponding parts in each of the hinged connecting means. In the case of the rear gangs the corresponding hinge structure includes two rod-receiving lugs 105.

In normal operation, the rear frame 25 and the associated extension gangs 37 are capable of swinging on the pipe end 26 relative to the main frame about a generally central fore-and-aft extending axis. However, when the implement is raised into its transport position by lowering the ground wheels, swinging of the rear units about a central axis is undesirable and according to this invention new and improved means is provided for raising the rear units so as to insure that they are in a centered position and held in that position whenever the ground wheels are lowered to transport the implement. This lifting and centering means will now be described.

A pair of lugs 115 are fixed to each wheel arm 55 adjacent the associated rockshaft 51 and a rearwardly extending thrust member 116 is pivotally connected at its forward end to each pair of the lugs 115. Each thrust bar 116 extends rearwardly, generally between the associated ground wheels, over the rear portion of the main frame 10 and rearwardly to a point adjacent the rear frame member 29. A roller 118 is carried by suitable brackets 119 underneath the associated push bar 116 so that the latter engages the associated roller 118. A lifting chain 123 is connected at its forward end with the lower portion of the associated ground wheel arm 55, as by apertured lugs 124, and is extended over the roller 118 and over a pulley 125 carried by the rear end portion of the thrust bar 116, the chain 123 then extending downwardly to a point of connection, as at 127, with the bar 29 of the rear frame 25. Each thrust bar 116 is made up of an angle 131 and a bar bent so as to form a U-shaped member 132 welded to the angle at a plurality of points. Adjacent the bent portion of the member 132 the latter is apertured to receive a pin 133 on which the associated pulley 125 is journaled. The thrust bar at the other side of the implement is substantially identical with that just described, and hence further description thereof is believed to be unnecessary.

In operation, when the ram unit 71 is extended to force the wheels downwardly and thus raise the implement, the downwardly and forward swinging of the arms 55 thrusts the associated bars 116 rearwardly. This rearward movement of the bars 116 acts through the downwardly and forward angled edges of the cam plates 121 to raise the rear ends of the bars 116. At the same time, the ground wheel arms 55, swinging downwardly and forwardly, exert a forward pull through the associated chains 123. Thus two lifting effects are produced, one by virtue of the upward movement of the rear portions of the bars 116 and the other by the pull exerted through the chains 123, and are combined to insure that the rear frame will be lifted or brought into a centered position and all rocking of the rear unit about the rear end of the pipe member 26 is thus prevented. In this way, the rear extension gangs 37 and 38 are held against oscillation, which might be objectional in many cases, as when transporting the implement with the outer gangs extended. Likewise, even when the extension gangs are folded, or brought around into transport position alongside the associated inner gangs, the dual raising action provided by the bars 116 and associated chains 123 insure that the rear frame and associated rear gangs, whether folded or extended, will be held in transport against undesirable oscillation.

While I have shown and described above the preferred structure in which the principles of the present invention have been incorporated, it is to be understood that my invention is not to be limited to the particular details, shown and described above, but that in fact, widely different means may be employed in the practice of the broader aspects of my invention.

What I claim, therefore, and desire to secure by Letters Patent is:

1. In a wheel harrow comprising a main frame, swingable ground wheel means movable to raise and lower said main frame, a disk gang movable generally vertically relative to said main frame when the latter is lowered, a part shiftably carried by said main frame and having one portion connected with said ground wheel means to be shifted when said ground wheel means is shifted to raise said main frame, a lifting connection between the rear portion of said part and said disk gang and including tension means connected between said disk gang and said wheel means and reacting against said shiftable part whereby movement of the wheel means when raising said gang serves to exert a lifting effect through said tension means on said disk gang, and means acting between said main frame and said part in response to movement of the latter when the main frame is raised relative to said ground wheel means for raising said part so as to exert additional lifting effect on said disk gang.

2. In a wheel harrow comprising a main frame, swingable ground wheel means movable to raise and lower said main frame, a front gang fixedly carried by said main frame, a rear gang movably carried by said main frame, a part shiftably carried by said main frame and having one portion connected with said ground wheel means to be shifted when said ground wheel means is shifted to raise said main frame, a lifting connection between the rear portion of said part and said rear gang, and cam means on said part and frame for elevating said part and the rear gang when said part is shifted rearwardly by operation of said wheel means in a direction to raise said main frame.

3. A disk harrow comprising a frame, a pair of disk gangs pivotally connected with said frame for generally up and down swinging, a pair of ground wheels movable generally vertically relative to said frame, means connected to act between said frame and said wheels for raising the frame relative to said wheels, a pair of rearwardly and upwardly movable parts connected with said frame-raising means to be moved by operation of said frame-raising means, and means connecting said parts with said gangs for shifting the swingable ends thereof relative to the frame when the latter is raised relative to said ground wheels.

4. In a disk harrow, a main frame including a central fore-and-aft extending frame bar extending rearwardly of the main portion of said main frame, front gang means fixed to the forward portion of said main frame, a rear disk gang means swingably connected at a midpoint with the rear portion of said frame bar rearwardly of the main portion of said main frame, frame raising means connected with said main frame means to raise the latter and said front and rear gang means to raise the latter into a transport position, fore-and-aft movable means carried by said main frame and connected with said frame-raising means to be shifted rearwardly when said main frame is raised, and means connected between said fore-and-aft shiftable means and said rear gang means for imparting additional raising movement in response to raising of said main frame into a transport position.

5. In a wheel harrow, a frame, wheel-carrying arm means swingably connected with said frame, gang means swingably connected with said frame, and means connected with said arm means and said gang means to hold the latter against movement relative to said frame when said arm means is shifted, said latter means including a thrust bar carried on said frame for generally fore-and-aft movement, means connecting the forward end of said bar with said arm means so as to be moved in a fore-and-aft direction by the arm means, and a lifting connection between the rear end of said thrust bar and said gang means for holding the latter against swinging.

References Cited in the file of this patent
UNITED STATES PATENTS

| | | |
|---|---|---|
| 2,352,491 | Orelind | June 27, 1944 |
| 2,540,265 | James | Feb. 6, 1951 |
| 2,754,647 | Bennett et al. | July 17, 1956 |
| 2,765,609 | Oehler et al. | Oct. 9, 1956 |